United States Patent

[11] 3,627,004

[72] Inventor Kenneth J. Ramey
 P.O. Box 146, Two Harbors, Minn. 55616
[21] Appl. No. 885,742
[22] Filed Dec. 17, 1969
[45] Patented Dec. 14, 1971

[54] ROTATABLE TREE SHEAR DEVICE
 11 Claims, 6 Drawing Figs.
[52] U.S. Cl. .................................................. 144/34 E
[51] Int. Cl. .................................................. A01g 23/02
[50] Field of Search ........................................ 144/34 R,
 34 E

[56] References Cited
 UNITED STATES PATENTS
 3,294,131 12/1966 Larson ..................... 144/34 E
 3,327,745 6/1967 Meece et al. ............ 144/34 E
 3,343,575 9/1967 Trout ....................... 144/34 R
 3,382,899 5/1968 White ...................... 144/34 E
 3,528,468 9/1970 Blonsky ................... 144/34 E FOREIGN PATENTS
 908,763 10/1945 France ..................... 144/34 E Primary Examiner—Gerald A. Dost
Attorney—Wicks & Nemer ABSTRACT: A tree shear device adapted to attach to the frame of a vehicle is disclosed. The shear includes a shear frame, an anvil member, a shear blade pivotally mounted on and carried by the anvil member to form a tree-cutting portion in association with the anvil member, a controlled rotatable drive mounted on the shear frame and attached to the tree-cutting portion for supporting it and for rotating it to a desired angle, and a device attached between the shear blade and the anvil for for causing the blade to pivot relative to the anvil to cut a tree positioned therebetween. Since the tree-cutting portion can be rotated and since the edge of the blade is specifically designed to cause the tree being cut to always fall to one side, as respects the blade and anvil, the tree being cut may be caused to fall to one side or the other by rotating the tree-cutting portion through an angle of 180°.

Patented Dec. 14, 1971

INVENTOR.
KENNETH J. RAMEY
BY
Wicks & Nemer
ATTORNEYS

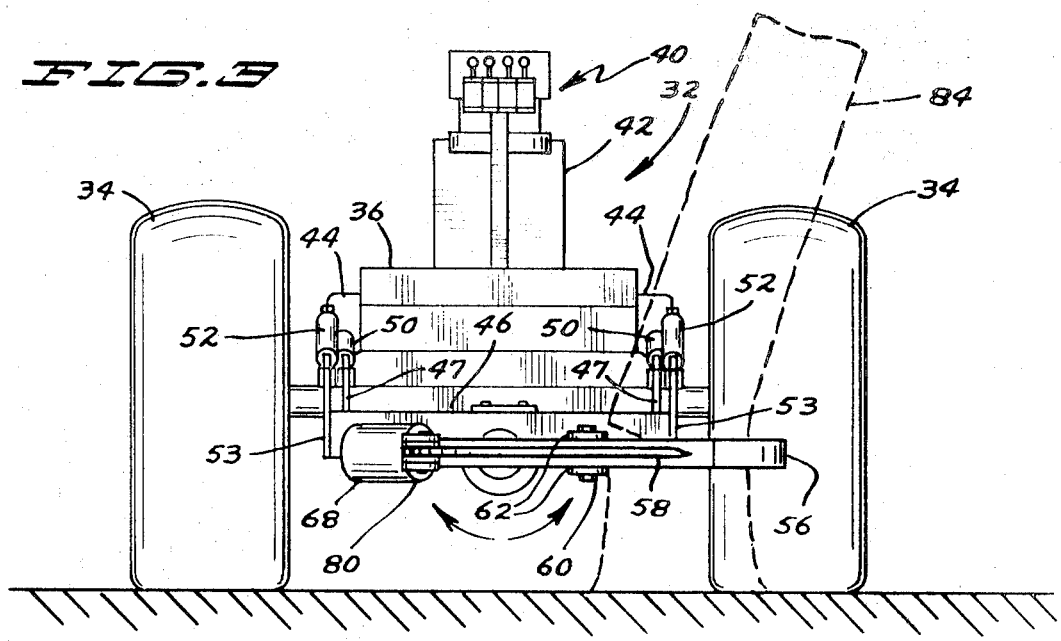
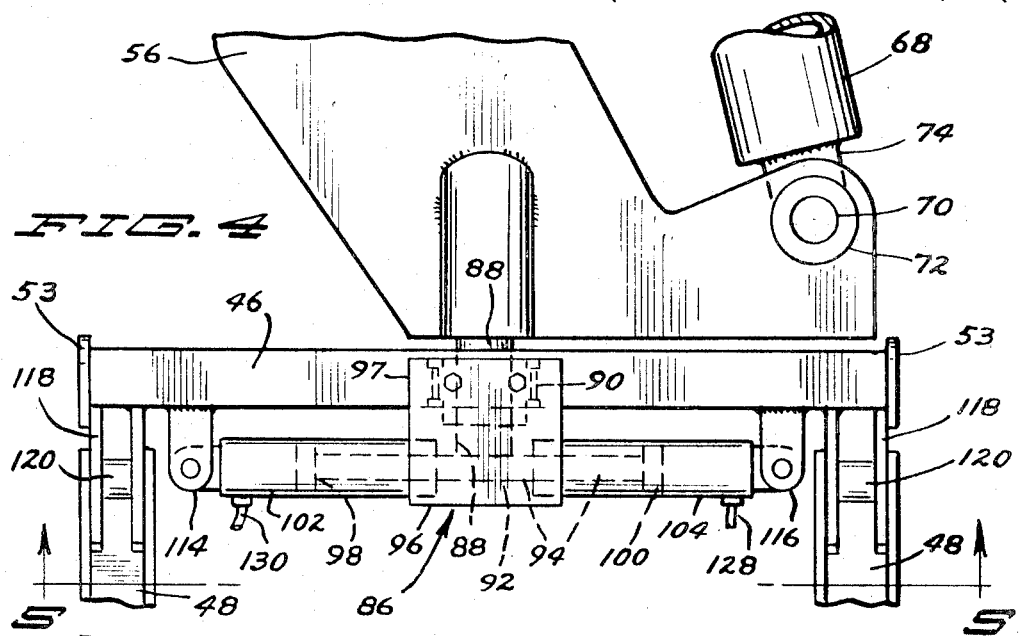
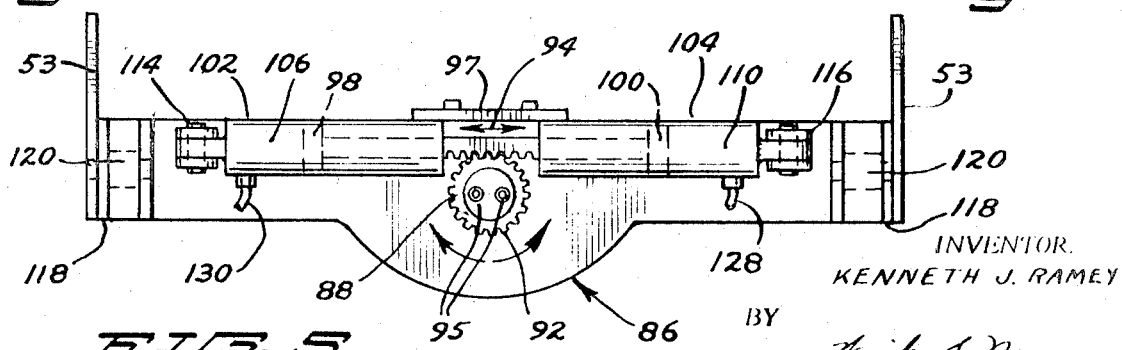

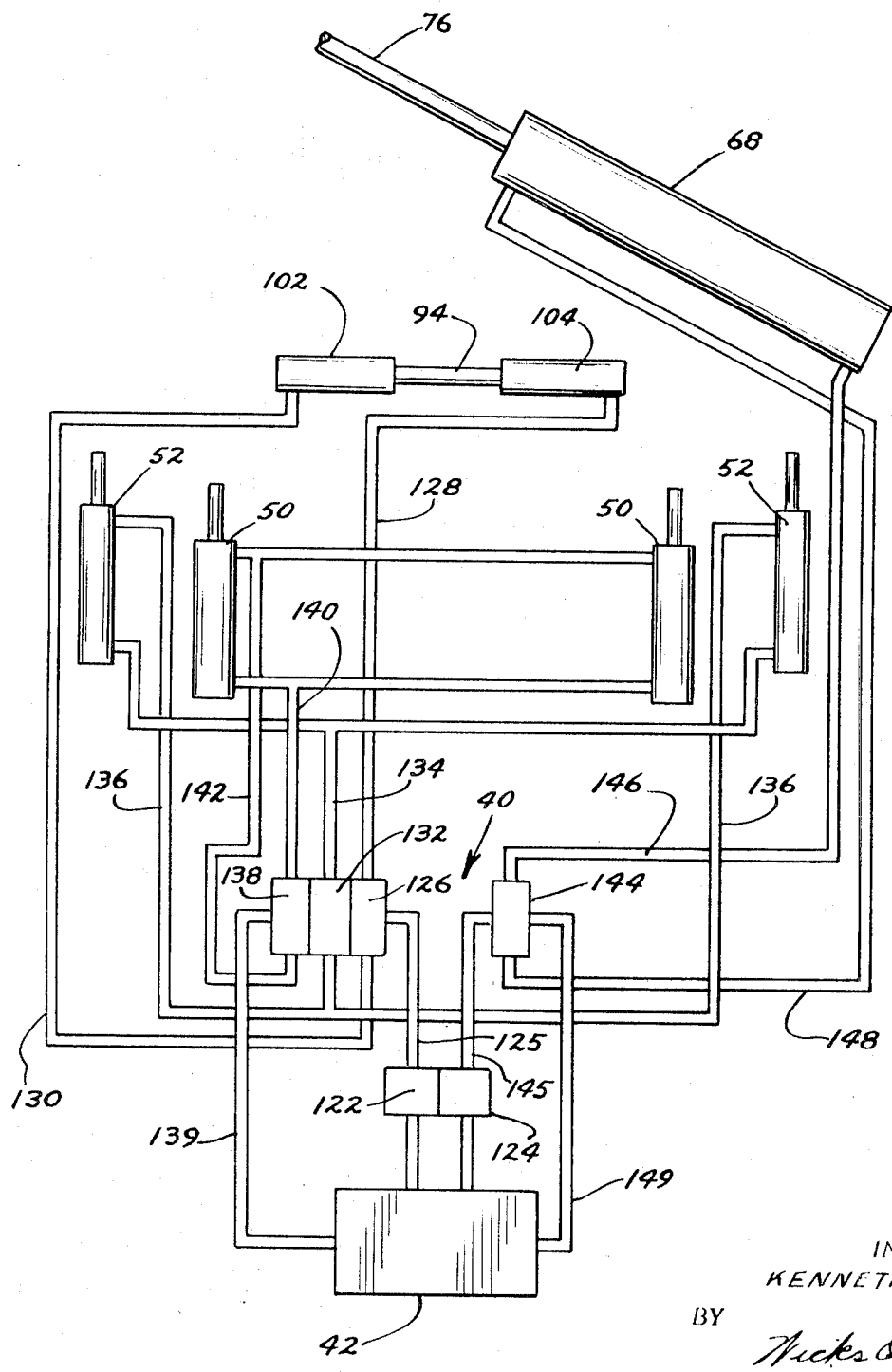

ROTATABLE TREE SHEAR DEVICE

SUMMARY OF THE INVENTION

This invention relates to tree-cutting apparatus, more particularly to tree-cutting apparatus adapted to attach to the frame of a mobile vehicle, and more particularly still to a tree shear device adapted to attach to the frame of a mobile vehicle. In the harvesting of tress it is frequently desirable to fell a tree in a certain direction due to terrain, other tress, etc. It is an object of the invention to provide a tree shear which will shear a standing tree so that it will fall either to the right or the left of the vehicle on which the tree shear is mounted.

Briefly, a preferred embodiment of the present invention includes a shear frame, an anvil member, a shear blade pivotally mounted on and carried by the anvil member to form a tree cutter in association with the anvil member, and a controlled rotatable drive mounted on the shear frame and connected to the tree cutter to support it and to rotate it to a desired cutting angle, when actuated. The controlled rotatable drive includes a shaft journaled in the shear frame and attached to the tree cutter, a pinion gear mounted on the shaft to rotate with it, a rack gear having its teeth engaging the teeth of the pinion gear, and a pair of hydraulic cylinders positioned at opposite ends of the rack gear with the rack gear extending between the pistons of the hydraulic cylinders. When actuated, the fluid flowing into one hydraulic cylinder and out of the other forces the pistons to move transversely, the piston movement causes corresponding transverse movement of the rack gear, the transverse movement of the rack gear rotates the pinion gear, and rotation of the pinion gear rotates the tree cutter.

The three shear device also includes another hydraulic cylinder device for causing the blade to pivot relative to the anvil to cut a tree positioned between the blade and the anvil when fluid pressure is applied to the piston of this hydraulic device. The angle of the shear blade in the preferred embodiment is ground wedge shaped so that a tree cut between the shear blade and the anvil will always fall towards the anvil. This way, if a tree is desired to fall leftward of the vehicle carrying the tree shear device, the tree cutter is rotated until the anvil is leftward of the shear blade. Conversely, when it is desired that a tree fall rightward of the vehicle carrying the tree shear device, the tree cutter is rotated until the anvil is rightward of the shear blade.

The preferred embodiment of the tree shear device of the present invention further includes hydraulic cylinders which raise and lower the shear frame relative to the frame of the mobile vehicle for causing the raising and lowering of the tree cutter in order to position it vertically with respect to the tree to be cut. More specifically, a lever member extends from the frame to of the mobile vehicle to the shear frame, and the lever is pivotally attached to both the vehicle frame and the shear frame. A first hydraulic cylinder is attached between the vehicle frame and the lever to lift the tree shear device into its proper vertical position, and a second hydraulic cylinder is attached between the lever and the shear frame to properly tilt the tree cutter with respect to the tree to be cut.

It is thus an object of he present invention to provide a novel tree shear device.

It is a further object of the present invention to provide a novel tree shear device in which the tree-cutting portion may be rotated to change the angular positioning of the tree-cutting portion with respect to the tree to be cut.

It is a further object of the present invention to provide a novel tree-cutting device in which the tree-cutting portion may be rotated through an angle of at least 180°, and in which the tree-cutting portion is arranged to cause the tree to be cut to always fall in a predetermined direction with respect to the cutting portion so that the direction of fall may be changed by rotating the cutting portion.

It is a further object of the present invention to provide a novel tree shear device which is vertically adjustable to allow the vertical positioning of a cutting portion with respect to a tree to be cut.

It is a still further object of the present invention to provide a novel hydraulically controlled tree shear.

These and further objects and advantages of the present invention will become clear in the light of the following detailed description of an illustrative embodiment of this invention described in conjunction with the drawings.

DESCRIPTION OF THE DRAWINGS

FIG. 3 shows a front elevational view of the tree shear device of FIG. 1 with a tree to be cut shown in phantom positioned within the cutting portion of the shear device.

FIG. 4 is an enlarged top plan view of a portion of the tree shear device of the present invention which controls the rotation of the cutting portion with some internal parts shown in phantom and some parts omitted for clarity.

FIG. 5 is a sectional view taken on the line 5—5 of FIG. 4.

FIG. 6 is a schematic representation of the hydraulic control of the tree shear device of the present invention shown in conjunction with the hydraulic cylinders operated.

Figure 1:
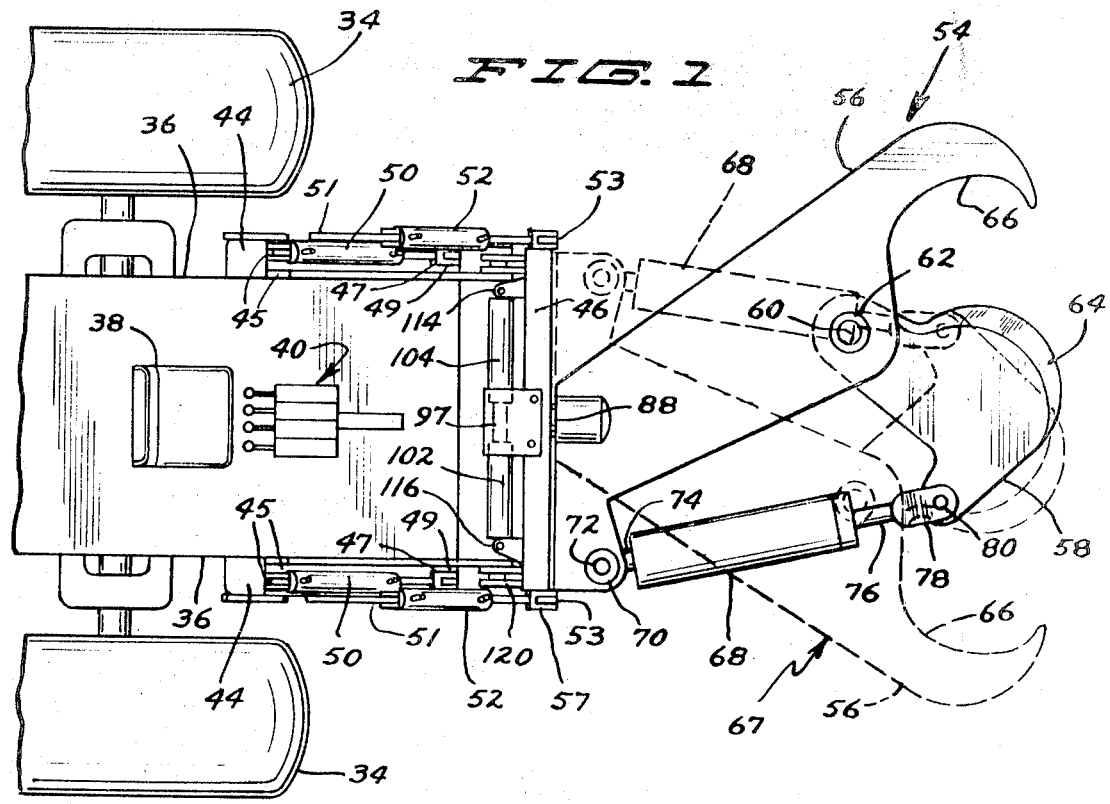
FIG. 1 shows a top plan view of the tree shear device of the present invention connected to the front portion of a tractor with the cutting portion of the tree shear device shown in solid line in a first position and shown in phantom in a second position 180° rotated from the first position.

Where used in the various figures of the drawings, the same numerals designate the same or similar parts. Furthermore, when the terms "right," "left," "front," and "back" are used herein it should be understood that these terms have reference only to the structure as shown in the drawings and are utilized only to facilitate describing the invention.

DESCRIPTION

In the first three FIGS. of the drawings, a mobile vehicle or tractor is shown and generally designated as 32. Tractor 32 includes four wheels 34, the front two of which are shown. Tractor 32 also includes a vehicle frame 36 supported by the wheels and in turn supporting an operators seat 38, actuating means in the form of control valves generally designated 40, and a hydraulic fluid reservoir 42 best seen in FIG. 3.

The tree shear device of the present invention is shown connected to tractor frame 36 as follows. A pair of shear frame and lift cylinder hangers 44 are welded to the tractor frame 36, one on the left side of tractor frame 36 and one on the right side. A transverse shear frame 46 is then connected to the shear frame hangers 44 by means of a pair of levers 48, best shown in FIG. 2. The right side lever 48 shown in FIG. 2 has a rearward extending end pivotally attached to the shear frame hanger 44 on the right side of tractor frame 36 and has a forward extending and pivotally attached to the right end of shear frame 46. An identical lever member 48 is similarly attached between the shear frame hanger 44 on the left side of tractor frame 36 and the left end of shear frame 46.

Four hydraulic cylinders attached to the tractor frame 36, lever members 48, and shear frame 46, allow the raising and lowering of the shear frame 46 relative to the tractor frame 36. In particular, identical shear life cylinders 50 are attached leftward and rightward of tractor frame 36 between shear frame hangers 44 and upward extending ears 47 welded to lever members 48. Shear lift cylinders 50 have a first end pivotally attached to bifurcated ears 45 horizontally projecting from hangers 44 and have a second end pivotally attached to the ears 47 on lever 48 by means of a bifurcated end 49 to allow an operator to change the angle between hanger 44 and lever 48 from the 90° angle shown in FIG. 2. Similarly, a pair of shear tilt cylinders 52 are positioned between levers 48 and shear frame 46 with one tilt cylinder positioned on the left side of tractor frame 36 and one tilt cylinder positioned on the right side. Tilt cylinders 52 have a bifurcated end 55 pivotally connected to upstanding ears 51 formed on lever member 48 and have another bifurcated end 57 pivotally connected to upstanding ears 53 formed on transverse shear frame 46 so as to allow an operator to vary the angular disposition of shear frame 46 relative to lever 48 from the 180° angle shown in FIG. 2.

The tree-cutting means or tree-cutting portion of the tree shear device of the present invention is generally designated as 54 and includes an anvil member 56 and a shear blade 58. Shear blade 58 is pivotally mounted on and carried by anvil member 56 by means of a short shaft 60 arranged at 90° to the plane of anvil member 56 and journaled within a pair of bosses 62 formed on the upper and lower surfaces of anvil member 56. Shear blade 58 has a semicircular, concave outwardly extending, angularly disposed, i.e. wedge-shaped shearing edge 64 which mates with a semicircular concave inwardly extending blade-receiving portion 66 of anvil member 56. The pivotal motion of shear blade 58 with respect to the anvil member 56 is caused by hydraulic means 67. Hydraulic means 67 includes a hydraulic cylinder 68 which has a first end pivotally attached to anvil member 56 by means of a shaft 70 journaled within upper and lower bosses 72 formed on anvil member 56 and passing through an extension 74 upon the one end of cylinder 68. Cylinder 68 includes a hydraulic piston, not specifically shown, arranged to reciprocally move within cylinder 68, and shear blade 58 is attached to the hydraulic piston through a piston rod 76. Specifically, one end of piston rod 76 has a forked extension 78, and shear blade 58 is pivotally connected between the tines of this forked extension by a short shaft 80 which is fixed to the forked extension 78 and is journaled within blade 58 and a pair of spacers 82 positioned above and below blade 58. Fluid pressure within hydraulic cylinder 68 forces the hydraulic piston and piston rod 76 to extend and pivotally brings the wedge-shaped edge 64 of shear blade 58 together with the blade-receiving portion 66 of anvil member 56. A tree positioned between blade edge 64 and blade-receiving portion 66 as positioned in FIG. 3 when cut falls to the right of FIG. 3 and as shown in phantom outline.

As previously discussed, a rotatable drive connects the cutting portion 54 of the tree shear device with the shear frame 46. The rotatable drive is enlarged in FIGS. 4 and 5 and generally designated as 86. The rotatable drive 86 includes a shaft 88 which is arranged at substantially 90° to shear frame 46 and has a frontward extending end fixedly attached to the rear end of anvil member 56, a center portion journaled within a bearing 90 carried by the shear frame 46, and a rearward extending end projecting through shear frame 46. A pinion gear 92 is fixedly attached to the rearward extending end of shaft 88 by two bolts 95. Rotatable drive 86 also includes a rack gear 94 with teeth which mesh with the teeth of pinion gear 92. Rack gear 94 is horizontally disposed parallel to the transverse shear frame 46 but spaced therefrom in a rearward direction towards the tractor 32. The rearward extending end of the shaft 88 carrying the pinion gear 92, the pinion gear 92, and the rack 94 are encased within a rack and gear protector box 96 which is grease filled. Cover plate 97 closes protector box 96. The horizontally arranged ends of rack gear 94 then extend leftward and rightward out of protector box 96 to attach to a left hydraulic piston 98 and a right hydraulic piston 100. Left hydraulic piston 98 is positioned for reciprocal motion within a left hydraulic cylinder 102 and right hydraulic piston is similarly positioned for reciprocal motion within a right hydraulic cylinder 104. Piston 98 defines a left chamber 106 within hydraulic cylinder 102, leftward of piston 98, and piston 100 similarly defines a right chamber 110 within cylinder 104, rightward of piston 100. The ends of cylinders 102 and 104 opposite protector box 96 are fixedly attached to a pair of bifurcated ears 114 and 116, respectively and positioned near the left and right extremities, respectively, of shear frame 46.

The connection between lever member 48 and transverse shear frame 46 may be more clearly seen in the enlarged view of FIGS. 4 and 5. In particular, forked extensions 118 are welded to the rear side of transverse shear frame 46 towards tractor 32. A pair of shafts 120 extend parallel to shear frame 46 between the tines of each extension 118 and one end of a lever member 48 is journaled upon each shaft 120 to pivotally connect lever member 48 with shear frame 46. The other end of the lever members 48 are similarly pivoted to shear frame hangers 44 by means of the shafts 121. The ears 53 pivotally connecting one end of shear tilt cylinder 52 are also shown in FIGS. 4 and 5.

FIG. 6 shows a schematic representation of the hydraulic system operating the tree shear device of the present invention. Specifically, hydraulic fluid reservoir 42 is shown connected to a pair of fluid pumps 122 and 124. Fluid pump 122 provides fluid to the control valves generally designated as 40. In particular, double-acting control valve 126 provides fluid to and accepts fluid from single acting hydraulic cylinders 102 and 104; double-acting control valve 132 provides fluid to and accepts fluid from double-acting hydraulic cylinders 52; double-acting control valve 138 provides fluid to and accepts fluid from double-acting hydraulic cylinders 50; and double-acting control valve 144 provides fluid to and accepts fluid from double-acting hydraulic cylinder 68.

OPERATION

In operating the preferred embodiment of the tree shear device of the present invention illustrated, an operator first decides in which direction the tree to be cut should fall and approaches the tree along a line which is 90° from the desired final position off the tree on the ground. The operator next arranges the cutting means 54 such that anvil 56 is directly towards the desired final position of the tree on the ground, i.e. the anvil 56 is closer to the side to which the tree is desired to fall than is the blade 58. The blade 58 is caused to pivot away from the anvil 56 to admit the tree between the edge 64 of the blade 58 and the blade-receiving portion 66 of anvil 56, such as is shown with respect to tree 84. The operator then activates hydraulic means 67 to cause blade 58 to pivot upon shaft 60 mounted on anvil 56 and shear the tree 84.

Specifically, assume the tree cutter 54 is in the position indicated by the phantom line representation of cutter 54 of FIG. 1 and assume the operator desires the tree to fall to his left, towards the top of FIG. 1. Since the angularly disposed edge 64 of blade 58 is designed to cause the tree 84 to fall towards anvil member 56, cutter 54 is 180° out of position to cause the tree to fall to the operator's left, and the cutter 54 must be rotated 180°. To rotate cutter 54, the operator actuates control valve 126 of FIG. 6 to cause fluid to flow from fluid reservoir 42, through pump 122, through tube 125, through control valve 126, through tube 130 and to hydraulic cylinder 102. The fluid fills chamber 106 within hydraulic cylinder 102 and causes the rightward transverse movement of the piston 98, the rightward transverse movement of rack 94, the clockwise movement of pinion 92 as seen in FIG. 5. The rightward transverse movement of rack 94 also causes the rightward transverse movement of piston 100 within hydraulic cylinder 104 which causes the emptying of chamber 110 within hydraulic cylinder 104. The fluid flowing from chamber 110 flows through tube 128, through control valve 126 and back to fluid reservoir 42 through tube 139 to complete the fluid circuit. The resulting clockwise rotation of pinion 92 causes the anvil member 56 to rotate under blade 58 from the phantom position shown in FIG. 1 to the solid line position shown in FIG. 1. When the desired angular position has been reached, the operator stops the rotation by stopping the fluid flow through control valve 126.

Figure 2:
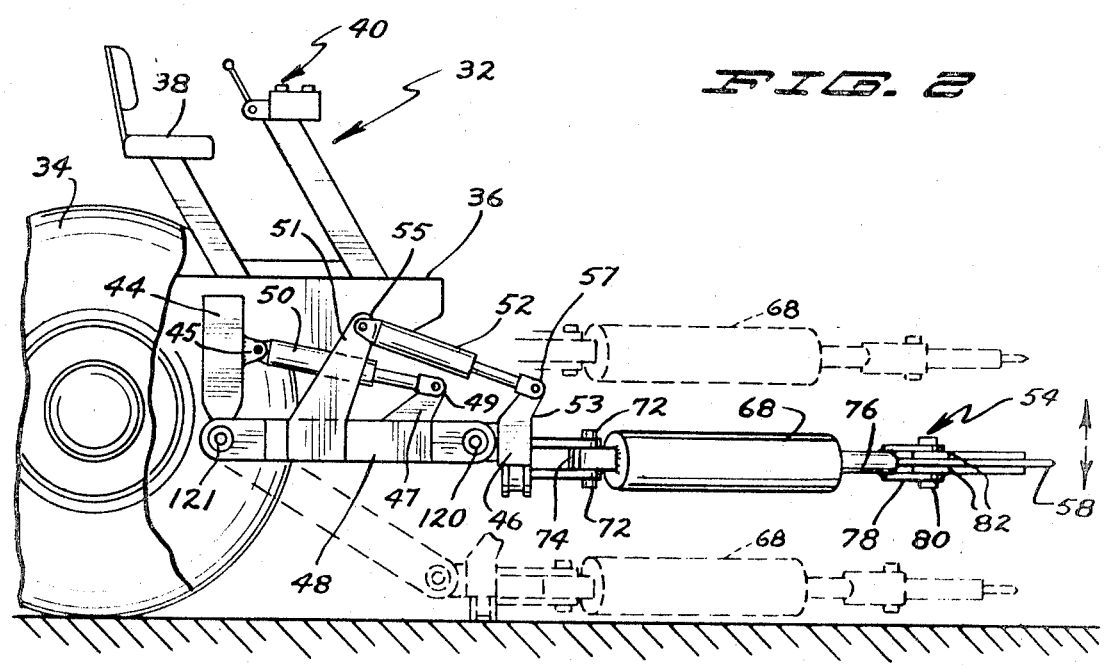
FIG. 2 shows a side elevational view of the tree shear device of FIG. 1 with the tree shear device shown in solid line in a first vertical position and shown in phantom in other vertical positions.

After the operator rotates the cutter 54 to the desired angular position, he can adjust the vertical position of cutter 54 to shear the tree at any desired height, between the ground and the maximum vertical position of cutter 54 shown in FIG. 2, as follows. Assume the operator wishes to move the cutter 54 from the solid line position shown in FIG. 2 to the phantom line position nearer the ground. Actuation of control valve 138 by the operator causes fluid to flow from hydraulic fluid reservoir 42, through pump 122, through tube 125, through control valve 138, through tube 140 and to the chamber within shear lift hydraulic cylinders 50 which cause the piston rods associated with cylinders 50 to further extend. This further extension of the piston rods from cylinders 50 causes the angle between lever member 48 and shear frame hanger 44, best seen in FIG. 2, to increase beyond 90°. Simultaneously, the operator activates control valve 132 to cause fluid to flow from hydraulic fluid reservoir 42, through pump 122, through tube 125, through control valve 132, through tubes 136, and to the chamber within shear tilt cylinders 52 which causes the piston rods associated with cylinders 52 to retract into cylinders 52. This retraction of the piston rods into cylinders 52 decreases the angle between lever member 48 and cutter 54 below the 180° straight angle, shown in solid line in FIG. 2, towards the angle shown in the phantom position. Thus, the shear lift cylinders 50 raise and lower the shear frame 46 with respect to the tractor frame 36, and the shear tilt cylinders 52 control the tilt of the cutter 54 to properly align it.

After the desired position is reached, the operator releases control valves 126, 132, 138 and activates control valve 144 to pivot blade 58 away from blade-receiving portion 66 of anvil member 56 in order to receive the tree to be cut. When there is sufficient space between blade 58 and the concave receiving portion 66 of anvil member 56 to receive the tree, the operator drives the vehicle forward to position the tree between the blade edge 64 of blade 58 and the blade-receiving portion 66 of anvil member 56 as in FIG. 3. By actuating control valve 144 and causing fluid to flow from fluid reservoir 42, through pump 124, through tube 145, through tube 146, through control valve 144, and into hydraulic cylinder 68, piston rods 76 is caused to further extend from the double-acting hydraulic cylinder 68, the blade 58 may be forced through the tree to be cut, and the tree caused to fall toward anvil member 56. By reversing the direction of hydraulic fluid flow such that fluid flows from hydraulic cylinder 68, through tube 148, through control valve 144, and to fluid reservoir 42, through the tube 149, blade 58 may be retracted from the blade-receiving portion 66.

Now that the basic teachings of the present invention have been explained, many extensions and variations will be obvious to one having ordinary skill in the art. For example, adjustment of cutter 54 has been explained such as to position it in a purely horizontal plane. This is not necessary, and cutter 54 may be positioned to accommodate a hilly or bumpy terrain in accordance with the explanation given. That is, the rotation of cutter 54 may leave it with an angle to the horizontal, and likewise the shear tilt cylinder 52, may be adjusted to allow an upward or downward slant to cutter 54.

I claim:

1. A tree shear device adapted to attach to the frame of a vehicle and rotatable to an angle of at least 180° to cause the tree to be cut to fall in a predetermined direction with respect to the tree shear, the direction of fall being changeable by rotation of the shear through the 180° angle, the shear comprising:
   a. a shear frame;
   b. an anvil member;
   c. a shear blade having a wedge-shaped shearing edge, the shear blade pivotally mounted on and carried by said anvil member, the combination of said shear blade and said anvil member forming a tree-cutting means, with the wedge-shaped shearing edge of said shear blade together with said anvil member directing the fall of the tree to be cut away from said shear blade;
   d. controlled rotatable drive means including means for actuating said drive means mounted on said shear frame and connected to the tree-cutting means for supporting the tree-cutting means and for rotating the tree-cutting means at least through an angle of 180° when actuated; and
   e. means connected between said shear blade and said anvil member for causing said blade to pivot relative to said anvil to cut a tree positioned therebetween, said wedge-shaped shearing edge of said blade causing the tree to fall in a predetermined direction with respect to the tree-cutting means, the direction of fall being changeable leftward or rightward of the vehicle by rotation of the tree-cutting means through an angle of substantially 180°.

2. The tree shear of claim 1, in which the controlled rotatable drive means includes a shaft journaled in the shear frame and connected to the tree-cutting means.

3. The tree shear of claim 2, in which the controlled rotatable drive means further includes:
   a. rack means arranged to move transversely;
   b. pinion means fixedly mounted on said shaft and arranged such that the teeth of said pinion means engage the teeth of said rack means; and
   c. means for traversely moving said rack means when actuated, the transverse movement of said rack means causing rotary movement of said shaft means through said pinion means for rotating the tree-cutting means.

4. The tree shear of claim 3, in which the means for transversely moving said rack means comprises:
   a. a hydraulic fluid reservoir;
   b. a fluid pump fluidically connected to said reservoir and;
   c. a pair of hydraulic fluid cylinders, fluidically connected to said pump and disposed at opposite ends of the rack means and including a pair of pistons, one piston connected to the first end of the rack means and the other piston connected to the second end of the rack means whereby actuation of a flow of hydraulic fluid from said reservoir, through said pump and to one of said hydraulic cylinders causes translational movement of the piston within said one cylinder and thereby causes translational movement of the rack means.

5. The tree shear of claim 4, in which said pivoting means for said blade comprises:
   a. a hydraulic cylinder having an end connected to said anvil member;
   b. a hydraulic piston reciprocally arranged within said hydraulic cylinder; and
   c. a piston rod having one end connected with the hydraulic piston and having the other end connected with said shear blade.

6. The tree shear of claim 5, also including means attached to said shear frame and adapted to attach to the vehicle frame for raising and lowering said shear frame relative to the vehicle frame for causing the raising and lowering of the tree-cutting means.

7. The tree shear of claim 6, in which said means for raising and lowering said shear frame includes hydraulic means.

8. The tree shear of claim 7, in which said means for raising and lowering said shear frame includes lever means pivotally attached to said shear frame and adapted to pivotally attach to the vehicle frame.

9. The tree shear of claim 8, in which said hydraulic means comprises:
   a. first hydraulic means pivotally attached to said lever means and adapted to attach to the vehicle frame for lifting said shear frame; and
   b. second hydraulic means pivotally attached to said lever means and said shear frame for tilting said shear frame.

10. The tree shear of claim 1, in which said pivoting means of said blade comprises:
    a. a hydraulic cylinder having an end connected to said anvil member;
    b. a hydraulic piston reciprocally arranged within said hydraulic cylinder; and
    c. a piston rod having one end connected with the hydraulic piston and having the other end connected with said shear blade.

11. The tree shear of claim 1, also including means attached to said shear frame and adapted to attach to the vehicle frame for raising and lowering said shear frame relative to the vehicle frame for causing the raising and lowering of the tree-cutting means.

* * * * *